United States Patent
Saxena et al.

(10) Patent No.: US 11,455,294 B2
(45) Date of Patent: Sep. 27, 2022

(54) INFORMATION LIFECYCLE MANAGEMENT NOTIFICATION FRAMEWORK

(71) Applicant: SAP SE, Walldorf (DE)

(72) Inventors: Nabhish Saxena, Bangalore (IN); Gayatri G, Honavar (IN); Revathi M P, Bangalore (IN); Shweta R Shanbhag, Bangalore (IN)

(73) Assignee: SAP SE, Walldorf (DE)

( * ) Notice: Subject to any disclaimer, the term of this patent is extended or adjusted under 35 U.S.C. 154(b) by 410 days.

(21) Appl. No.: 16/657,437

(22) Filed: Oct. 18, 2019

(65) Prior Publication Data

US 2021/0117405 A1 Apr. 22, 2021

(51) Int. Cl.
*G06F 16/00* (2019.01)
*G06F 16/23* (2019.01)
*G06F 9/54* (2006.01)

(52) U.S. Cl.
CPC .......... *G06F 16/2365* (2019.01); *G06F 9/541* (2013.01); *G06F 9/542* (2013.01); *G06F 16/2358* (2019.01)

(58) Field of Classification Search
None
See application file for complete search history.

(56) References Cited

U.S. PATENT DOCUMENTS

| | | | |
|---|---|---|---|
| 7,376,969 B1* | 5/2008 | Njemanze | H04L 63/1425 709/224 |
| 9,945,717 B2* | 4/2018 | Lewis | G01D 1/02 |
| 9,946,717 B2* | 4/2018 | Lim | H04L 63/10 |
| 10,395,330 B2* | 8/2019 | Dorris | G16H 20/10 |
| 11,146,600 B2* | 10/2021 | Pearl | G06F 16/11 |
| 2004/0012620 A1* | 1/2004 | Buhler | G09F 27/00 715/716 |
| 2013/0031565 A1* | 1/2013 | Wachter | G06F 8/38 719/313 |
| 2013/0227352 A1* | 8/2013 | Kumarasamy | G06F 11/3006 714/47.1 |
| 2016/0316019 A1* | 10/2016 | Mehta | H04L 67/18 |
| 2016/0330219 A1* | 11/2016 | Hasan | H04L 63/1408 |
| 2016/0342805 A1* | 11/2016 | Lim | G06F 21/316 |
| 2016/0350399 A1* | 12/2016 | Tinsley | H04L 67/10 |
| 2017/0041296 A1* | 2/2017 | Ford | G06F 16/951 |
| 2017/0220799 A1* | 8/2017 | Tinsley | G06F 21/554 |

(Continued)

*Primary Examiner* — Jean M Corrielus
(74) *Attorney, Agent, or Firm* — Buckley, Maschoff & Talwalkar LLC

(57) ABSTRACT

According to some embodiments, systems and methods are provided, comprising a data uniformity framework module; a data uniformity framework processor in communication with the data uniformity framework module and operative to execute processor-executable process steps to cause the system to: receive an indication that an action event was executed at a primary application; extract one or one or more key data elements affected by the execution of the action event; log the extracted one or more key data elements in a notification log; receive a request from a secondary application for the logged data; transmit the logged data to the secondary application; and manipulate secondary application data that corresponds to the logged data to replace the secondary application data with the logged data. Numerous other aspects are provided.

20 Claims, 5 Drawing Sheets

(56) References Cited

U.S. PATENT DOCUMENTS

| | | | |
|---|---|---|---|
| 2017/0319581 A1* | 11/2017 | Bladt | A61P 35/02 |
| 2017/0329505 A1* | 11/2017 | Richter | G06F 8/38 |
| 2018/0270290 A1* | 9/2018 | Sinha | G06F 11/2082 |

\* cited by examiner

INFORMATION LIFECYCLE MANAGEMENT NOTIFICATION FRAMEWORK

BACKGROUND

A system landscape for an organization may be complex and may involve multiple connected software systems each running at least one application. Data may be exchanged and/or duplicated between the applications to facilitate organizational processes and enable analytics on the data generated by these applications. Data uniformity across these connected software systems may ensure coherent business processes and legal compliance per Article 19 of the European Union General Data Protection Regulations (GDPR), or any other suitable compliance governing body.

To meet legal compliance requirements, archiving and deletion actions may be executed with regard to personal or sensitive data when processing personal or sensitive data. Conventionally, the archiving and deletion actions are performed individually in each connected system, which may result in: software systems being out of sync, (e.g., data variability between systems), the introduction of errors by executing the action multiple times in multiple systems, and the need for the time-consuming task of syncing all of the connected software systems.

Systems and methods are desired which support efficient synchronization and uniformity of data across the system landscape.

DETAILED DESCRIPTION

Figure 1:
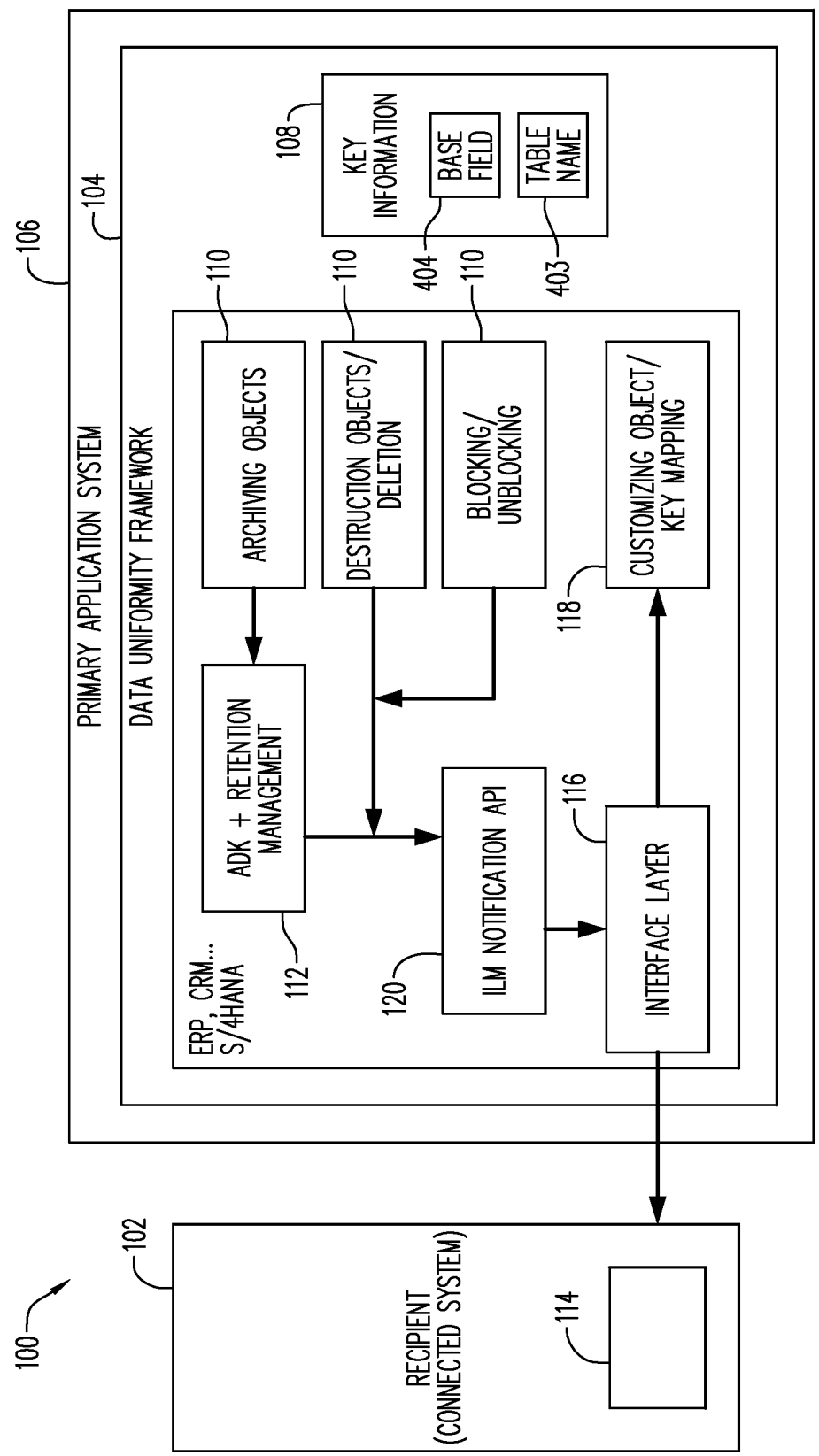
FIG. 1 is a block diagram of a system architecture according to some embodiments.
Figure 2:
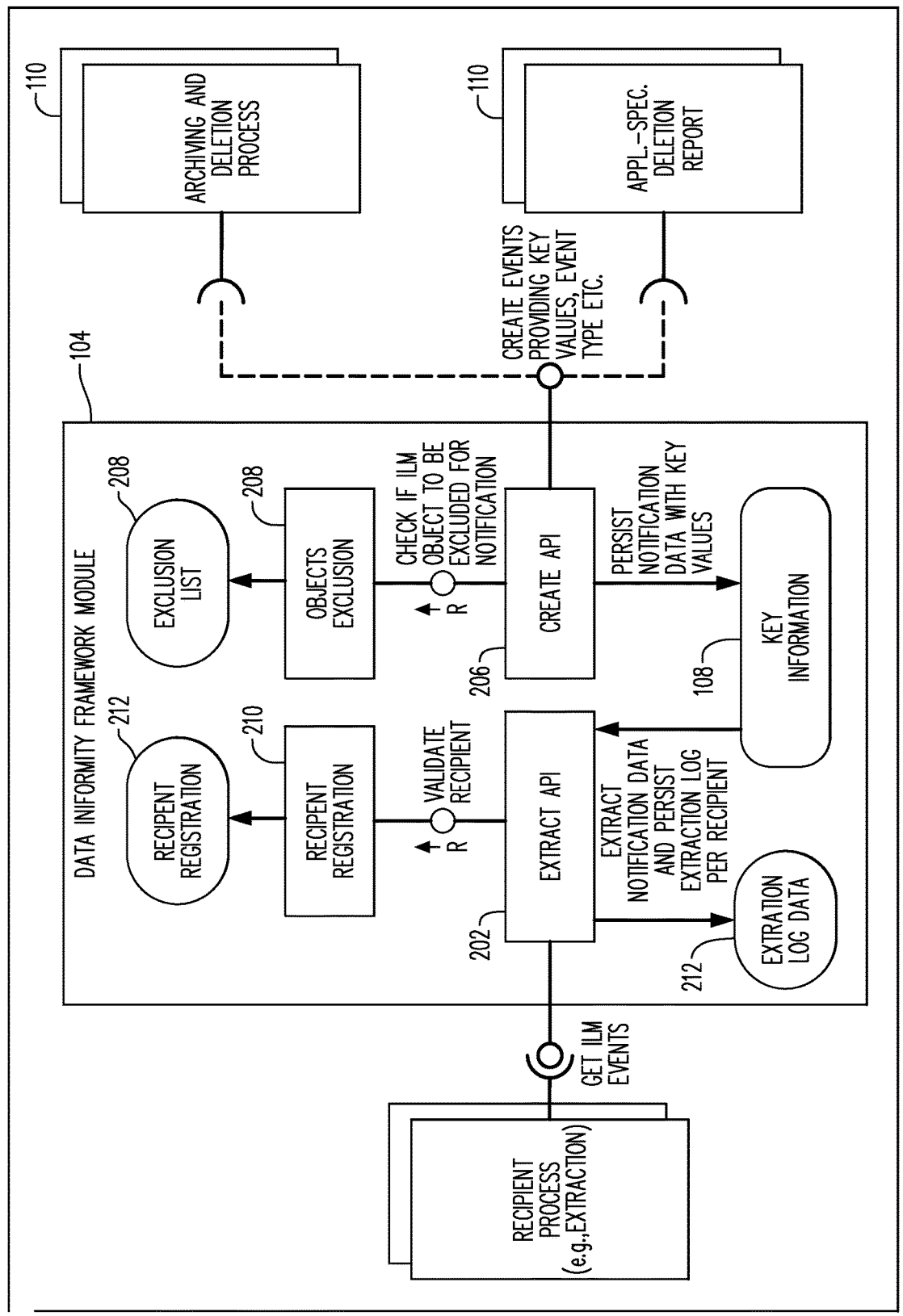
FIG. 2 is a block diagram of a system architecture according to some embodiments.
Figure 3:
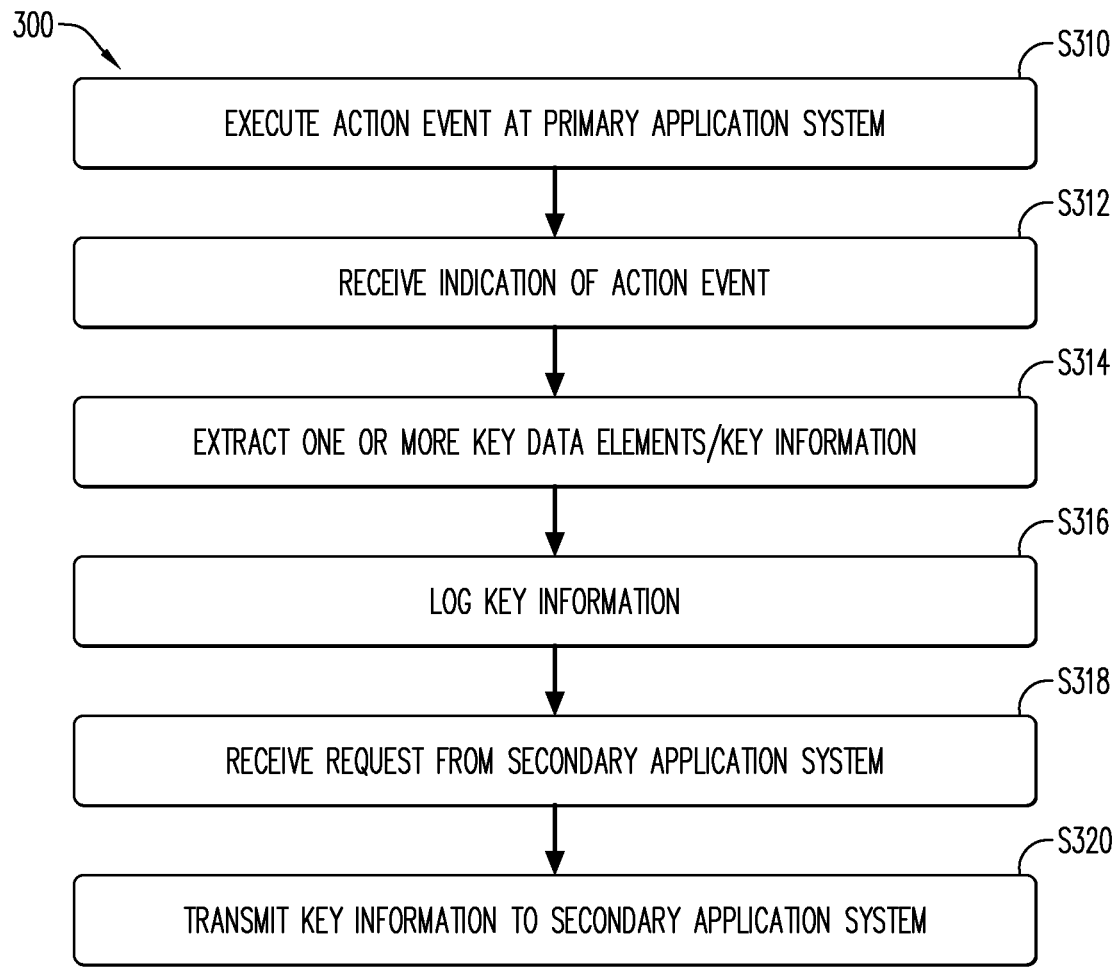
FIG. 3 is a flow diagram of a process according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

A system landscape for an organization may be complex and may involve multiple connected software systems, each running at least one application. The data may be exchanged and/or duplicated between the software systems to facilitate organizational processes and enable analytics. The executed processes in one system may generate data, and then another system may receive this data as input and execute analytic processes on this data. The data may include both personal data and transactional data.

In one or more areas of the world, compliance requirements may be in effect regarding personal and sensitive information. For example, per Article 19 of the EU-GDPR, any (external) recipient of personal data needs to be informed if personal data is rectified, blocked, restricted or deleted. As such, to comply with these requirements, it may be necessary to take an action like archiving, blocking or deletion when processing personal or sensitive data, and to have that action perpetuated in another software system that receives the data. Typically, these actions are executed in one system and not recorded or made available to other connected software systems. Consequently, a user had to perform the action (e.g., deletion, archiving, blocking) in every connected system, which may be a time-consuming and error-prone endeavor.

One or more embodiments provide for a data uniformity framework module that makes available to connected systems, personal data that is blocked, archived or deleted in one system, to ensure that the replicated data (i.e., data replicated in the connected system) is handled in the same way in the connected system to achieve data uniformity and meet data protection requirements. In one or more embodiments, the connected system may need to access blocked/archived/deleted information to adhere to compliance requirements. Some non-exhaustive examples of compliance requirements are: an organization's security standard (e.g., erase personal data when all applicable retention periods have expired) and data privacy regulations (e.g., Article 19 of EU GDPR, Article 5 (1) lit. d GDPR).

In one or more embodiments, the data uniformity framework module captures key information that uniquely identifies the overall data being processed by a primary system during an action process. The key information may refer to a combination of table name, field name and run time value. The key information may be logged during an action process that happened for a particular business object instance. The action process may be at least one of archive write, archive delete, data destruction run using archive write report, data destruction of archive files, destruction run using data destruction object (DOBJ), blocked and unblocked. It is noted that multiple parallel processing may occur at the same instance of time. For example, two actions at same time for different business objects is possible, but not on the same set of business data. In one or more embodiments, the key information may be enriched with additional data via extension features, for example. The enriched data may be additional or transitively related data that may be included in notification logging. The enriched data (additional or transitively related) thus logged may help the data uniformity framework module identify all related data on which the action processes may be performed so that compliance may be achieved in the connected systems. In one or more embodiments, the connected system may extract the logged key information and perform any necessary actions in their respective system to achieve data uniformity. It is noted that in the primary system, the data was processed and after that a decision was made to archive or destroy the data. The processes of the data need not be repeated in the secondary (connected) system with the decision having already been made. With this decision having been made, the data is handled in the same manner in the secondary (connected) system.

In one or more embodiments, one or more secondary systems are connected to a primary system. When executed, the primary system generates data. The data generated by the primary system may be subject to an action process, as described above. The secondary system may periodically check the data uniformity framework to determine whether any data generated by the primary system has been subject to the action process and then may pull the information. In one or more embodiments, the secondary system is determining whether any data fields tagged as "action/event" have been subject to an action process. The secondary system may determine, upon checking the data uniformity framework, that "action event" data fields have been subject to the action process via receipt of a notification from the data uniformity framework module indicating such. When the secondary system receives the notification, the secondary system may extract the tagged data fields and change the data in the corresponding fields in their system to match the data in those tagged fields in the first system per the data uniformity framework module. The inventors note that one or more embodiments provide for avoiding redundant effort of analyzing the data to arrive at a conclusion to fulfil compliance requirements in connected systems, as the key information to identify the data is already available per the data uniformity framework module.

The inventors note that one or more embodiments may provide for the automatic logging of action processes, with no manual effort involved in recording key information of data. Reduction of the manual effort subsequently helps in reducing the total cost of operation in a connected system landscape. As used herein, the terms "action process" and "action event' may be used interchangeably. Provisioning of the key information logged during the enabled mass data processing described by embodiments may facilitate the necessary actions to be performed in the connected systems for achieving data uniformity. It may also ensure that outdated data is cleansed from the connected systems resulting in coherent data. The key information may include details about the decision taken in the application system related to data retention management. Thus, execution of logic is not required in the connected system to arrive at similar decisions. As such, the overhead of analyzing data replicated in the connected systems may be avoided. Additionally, application knowledge for taking such decisions in the connected systems may be omitted.

Some embodiments provide for accessibility to notification information for extraction by a connected system, so the connected system can fulfill compliance requirements. The notifications for relevant business objects may be logged. The extraction of notifications by the connected system may be logged, and the logging may be used to track the notifications extracted per connected system. Embodiments may make inferences of the access restriction on data (like blocking date) accessible to the connected system. Embodiments provide a retention management feature for notification data and extraction logs so that notifications may be deleted after the end of data purpose. The inventors also note that time-consuming checks on the data may be made in a single system, and then direct actions may be executed on the data identifiable via notification key information in the connected system. The inventors further note that when a connected system is newly set up, extraction of readily available notification information from a primary system may be easier using one or more embodiments. As used herein, the terms "primary application system", "primary application" and "source system" may be used interchangeably. As used herein, the terms "secondary system," "secondary application system", "recipient system," "recipient" and "connected system" may be used interchangeably.

FIGS. 1-4 include flow diagrams of a process 300 (FIG. 3) for executing a data uniformity framework module according to some embodiments. Process 300 may be executed by application server 430 according to some embodiments. In one or more embodiments, the application server 430 may be conditioned to perform the process 200, such that a processor 510 (FIG. 5) of the server 430 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process, one or more secondary application systems 102 of a system 100 may be registered with a data uniformity framework module 104 via a recipient registration process 210. The data uniformity framework module 104 may receive recipient data 212, validate the secondary application system 102 and may provide the configuration to register the secondary application system 102. Registration may allow the secondary application system 102 to extract key information 108 therefrom. It is noted in one or more embodiments, the primary and secondary application systems are connected via existing channels used for other data transfer.

In one or more embodiments, also prior to the start of the process 300, a primary application system owner (not shown) may designate or tag each of two or more base fields 404 in the primary application system 106 as a key data element 108. It is noted that, in one or more embodiments, the data uniformity framework module 104 may reside on the primary application system 106. As used herein, the "key data element" may refer to a combination of a table name 403 and a field name mapping that may be used by the secondary application system 102 to identify corresponding data therein. The field name mapping may correspond to table name and field of the table. In one or more embodiments, the key data element may refer to base or raw data (e.g., data from key data elements defined by primary application owner) or manipulated data (e.g., base data that has been manipulated). As a non-exhaustive example, only order number is available at processing, which may be tagged, but another system may enhance order number with additional information. In this instance, the module may leave a placeholder available for this enhanced information in the persistence layer. Further, as this data is generated, it is stored in the persistence layer. In one or more embodiments, the primary application system owner may define the key data element 108 via a selection of one or more business objects. The key data elements 108 may be used to uniquely identify that data being processed and may be used by the secondary application system 102 to perform corrective actions thereon (e.g. deletion, restricted access (block/unblock), archive, etc.) to enable data uniformity between the primary and secondary application system in the system landscape 100. In one or more embodiments, the application system owner may indicate to the data uniformity framework module 104 related fields 406 that are related to the key data element where related fields are different from the base fields. By providing the related fields 406, one or more embodiments may track action events applied to the data in related fields 406 that may affect the key data element 108, and in turn result in execution of this process 300. In one or more embodiments, the tagging may be via a defined set of information sources identified as tablename-fieldname of the data under processing. This tagging may be the configuration done at the business object level.

In one or more embodiments, the designation of a key data element may be via a flag (i.e., in the case of a block/unblock action event), or any other suitable identifier. In one or more embodiments, for a delete action event, when a record is deleted from the primary application system, information that this set of data with key fields has been removed is moved into another file. The instance of moving the data from the primary application system to the other file may be marked as a delete event action.

A non-exhaustive example of a sales/purchase order may be used herein to illustrate some of the features.

An exclusion list 204 may be created prior to the process 300. In one or more embodiments, the exclusion list may be a list of business objects that are not relevant for notification logging due to organizational reasons.

Initially, at S310, an action event 110 is executed at the primary application system 106. The action event 110 may be an archive event, delete event, block/unblock event. The action event 110 may be executed locally in the primary application system 106 to ensure relevant data is preserved while the data that is no longer in productive use may be archived, deleted or destroyed from the system, or blocked/restricted from use. As a non-exhaustive example, within an application system, a customer with ID number 1234 has completed all his business and can then be blocked. Once this customer is blocked, the customer information may still exist in the system, but may not be available for viewing to a general user so that the general user cannot create a sales order for customer with ID number 1234. Continuing with the non-exhaustive purchase order example, the data undergoes a deletion event. Then in S312, an indication that the action event was executed at the primary application system 106 is received at the data uniformity framework module 104. In one or more embodiments, the indication may be in the processing action into which this framework is also embedded. During the processing, the framework may also be triggered to create a log entry. Next, in S314, one or more key data elements 108 affected by the execution of the action event 110 may be captured/recorded. As the action event 110 is occurring, the key data elements that have been tagged by the primary application system owner may be extracted from the data set being processed, along with other information to form the key information 408 (where the key information is, e.g., a combination of table name, field name (key data element) and runtime value). The key information may be logged in a notification log 410 in S316 and stored in a persistence layer 412 of the data uniformity framework module 104. In one or more embodiments, the configuration of the combination of table name and field name whose runtime value will be logged in the persistence layer may be maintained for all business objects that are relevant for notification logging (e.g., key data elements of the business object). In one or more embodiments, the data processing (e.g., archiving/deletion of data), an Archiving Development Kit (ADK) process/tool to trigger archiving process of data 112, described below, or any other suitable process may initiate a "Create Application Programming Interface" (Create API) process 206, or any other suitable process, for logging the key information in an API. The key information 108 supplied to the API may be preserved in the persistent layer at runtime. In one or more embodiments, the create API process 206 may execute an object exclusion process 208 to determine whether any of the business objects are listed as part of the exclusion list 204 and not fields. When a business object is in the exclusion list 204, the create API process/objection exclusion process may exclude the business object from being recorded and persisted, as well as from notification logging.

In one or more embodiments, an archiving development kit (ADK)/retention management process 112 may be triggered by the action event 110 or other events to log key information in the corresponding process in the notification log 410, stored in the persistence layer 412. In one or more embodiments, the logged key information may also include the action event and a time stamp of the action event. It is noted that in one or more embodiments, the ADK/retention management process may be triggered by archiving and deletion, but not restrictions.

It is noted that in one or more embodiments, a user may turn the process 300 on and off. A notification function may be used to switch the process 300 ON or OFF in the primary application system where the action events are executed. Switching the process OFF may prevent logging of key data element information relevant for notifications without affecting other primary application system processes.

At some time following the logging of the key information in S316, a request for the logged key information is received from a secondary application system 102 in S318. In one or more embodiments, the request may be received via a notification API 120. In one or more embodiments, prior to execution of the process 300, the secondary application system 102 is configured with one or more extractors 114 that retrieve information from the primary application system 106 via an extract API process 202. In one or more embodiments, the secondary application system 102 may periodically check the data uniformity module 104 via the notification API 120, and in particular the persistence layer 412 thereof, to determine whether the action event 110 has been executed and then pull the information when it has been executed. In one or more embodiments, the checking and data pulling may be hourly, daily, weekly, or any other suitable time interval. It is noted that the checking and pulling may occur periodically instead of necessarily immediately following the occurrence of the action event, as the replication process used to match the data in the secondary application system to the primary application system is configured to run in an organization downtime, as migrating a large amount of data to a connected system may use resources best available at the downtime.

In one or more embodiments, when the secondary application system 102 requests the extracted key information 108, the request may be via an "Extract API" process 202, or any other suitable extraction process. The Extract API process 202 may be called by the secondary application system 102 to access the key information 108. It is noted that in one or more embodiments, the extract API process 202 may also persist an extraction log for each secondary application system call. The extraction log may include information about the secondary system that has received the information, time at which the data was requested, and the log identifier, which was shared with the secondary system. Data in the extraction log 212 may be logged and may be used in further analysis and/or reporting. As a non-exhaustive example, SAP BUSINESS WAREHOUSE (BW)® may be a secondary application system 102 that includes an extractor 114 to extract the key information 108 from the persistent layer 412 and transfer the key information to the SAP BW so that SAP BW may perform appropriate actions on the corresponding data, thus enabling data synchronization and compliance with the data in the primary application system 106. It is noted in one or more embodiments, that the logging and extraction of the key information may be controlled via an authorization object. It is further noted that since key information logging generates and persists additional data in the system, the data uniformity framework module 104 may provide, in one or more embodiments, for retention management of this meta information via destruction objects, or other suitable objects. The destruction object may provide for the notification logs 410 to be deleted from the system after a pre-configured retention period.

Turning back to the process 300, the key information 108 extracted by the Extract API process 202 may be transmitted to the secondary application system 102 in S320. In one or more embodiments, the data uniformity framework module 104 may include an interface layer 116. The interface layer 116 may map the key information into a format understandable by the secondary application system 102. In one or more embodiments, prior to the execution of the process 300, a map 118 is created by the primary application system. In one or more embodiments, an application expert may create the map. The map may show the key information from the primary application system and the corresponding information in the secondary application system. As some non-exhaustive examples, the map may show the document number in the primary system linked to the sales order in the secondary system; the Partner ID may be mapped to customer or vendor; a Commercial Project ID may be mapped to an Engagement Project, etc.

Figure 4:
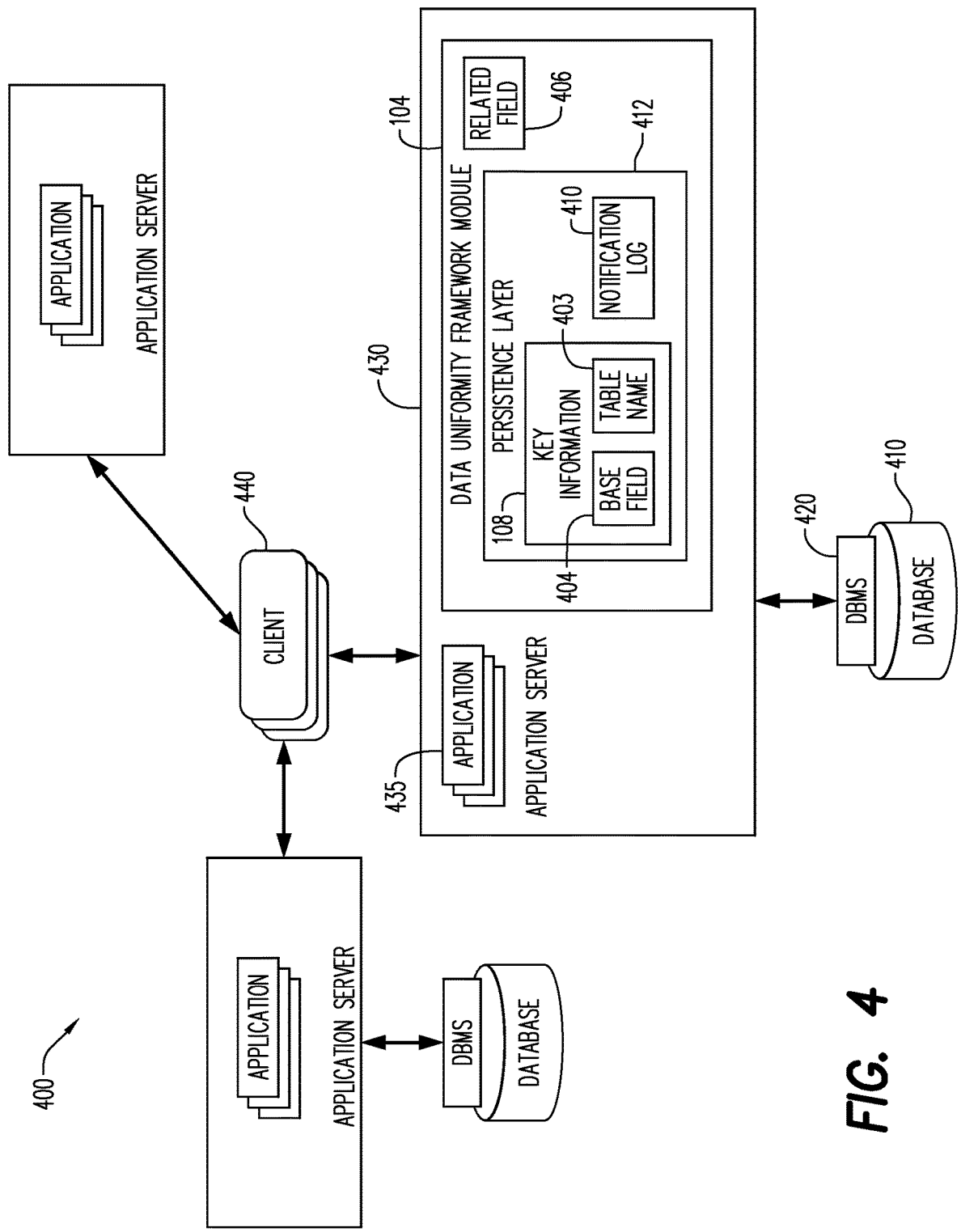
FIG. 4 is block diagram of a system architecture according to some embodiments.

FIG. 4 is a block diagram of system architecture 400 according to some embodiments. Embodiments are not limited to architecture 400 or to a three-tier database architecture.

Architecture 400 includes database 415, database management system (DBMS) 420, application server 430, applications 435, clients 440 (e.g., secondary application system), a data uniformity framework module 104. Applications 435 may comprise server-side executable program code (e.g., compiled code, scripts, etc.) executing within application server 430 to receive queries from clients 440 and provide results to clients 440 based on data of database 415. A client 440 may access the data uniformity framework module 104 executing within application server 430. Additionally, the client 440 may access their respective application server storing other applications.

Application server 430 provides any suitable interfaces through which the client 440 may communicate with the data uniformity framework module 104 or applications 435 executing on application server 430. For example, application server 430 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 435 executing on server 430 may communicate with DBMS 420 using database management interfaces such as, but not limited to, Open Database Connectivity (ODBC) and Java Database Connectivity (JDBC) interfaces. These types of applications 435 may use Structured Query Language (SQL) to manage and query data stored in database 410.

DBMS 420 serves requests to retrieve and/or modify data of database 410, and also performs administrative and management functions. Such functions may include snapshot and backup management, indexing, optimization, garbage collection, and/or any other database functions that are or become known. DBMS 420 may also provide application logic, such as database procedures and/or calculations, according to some embodiments. This application logic may comprise scripts, functional libraries and/or compiled program code.

Application server 430 may be separated from, or closely integrated with, DBMS 420. A closely-integrated application server 430 may enable execution of server applications 435 completely on the database platform, without the need for an additional application server. For example, according to some embodiments, application server 430 provides a comprehensive set of embedded services which provide end-to-end support for Web-based applications. The services may include a lightweight web server, configurable support for OData, server-side JavaScript execution and access to SQL and SQLScript.

Application server 430 may provide application services (e.g., via functional libraries) which applications 435 may use to manage and query the data of database 415. The application services can be used to expose the database data model, with its tables, hierarchies, views and database procedures, to clients. In addition to exposing the data model, application server 430 may host system services such as a search service.

Database 415 may store data used by at least one of: applications 435 and the data uniformity framework module 104. For example, database 415 may store one or more key data elements 108 accessed by the data uniformity framework module 104 during execution thereof.

Database 415 may comprise any query-responsive data source or sources that are or become known, including but not limited to a structured-query language (SQL) relational database management system. Database 415 may comprise a relational database, a multi-dimensional database, an eXtendable Markup Language (XML) document, or any other data storage system storing structured and/or unstructured data. The data of database 415 may be distributed among several relational databases, dimensional databases, and/or other data sources. Embodiments are not limited to any number or types of data sources.

In some embodiments, the data of database 415 may comprise one or more of conventional tabular data, row-based data, column-based data, and object-based data. Moreover, the data may be indexed and/or selectively replicated in an index to allow fast searching and retrieval thereof. Database 415 may support multi-tenancy to separately support multiple unrelated clients by providing multiple logical database systems which are programmatically isolated from one another.

Database 415 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 440 may comprise one or more individuals or devices executing program code of a software application for presenting and/or generating user interfaces to allow interaction with application server 430. Presentation of a user interface as described herein may comprise any degree or type of rendering, depending on the type of user interface code generated by application server 430.

For example, a client 440 may execute a Web Browser to request and receive a Web page (e.g., in HTML format) from a website application 435 of application server 430 via HTTP, HTTPS, and/or WebSocket, and may render and present the Web page according to known protocols. The client 440 may also or alternatively present user interfaces by executing a standalone executable file (e.g., an .exe file) or code (e.g., a JAVA applet) within a virtual machine.

Figure 5:
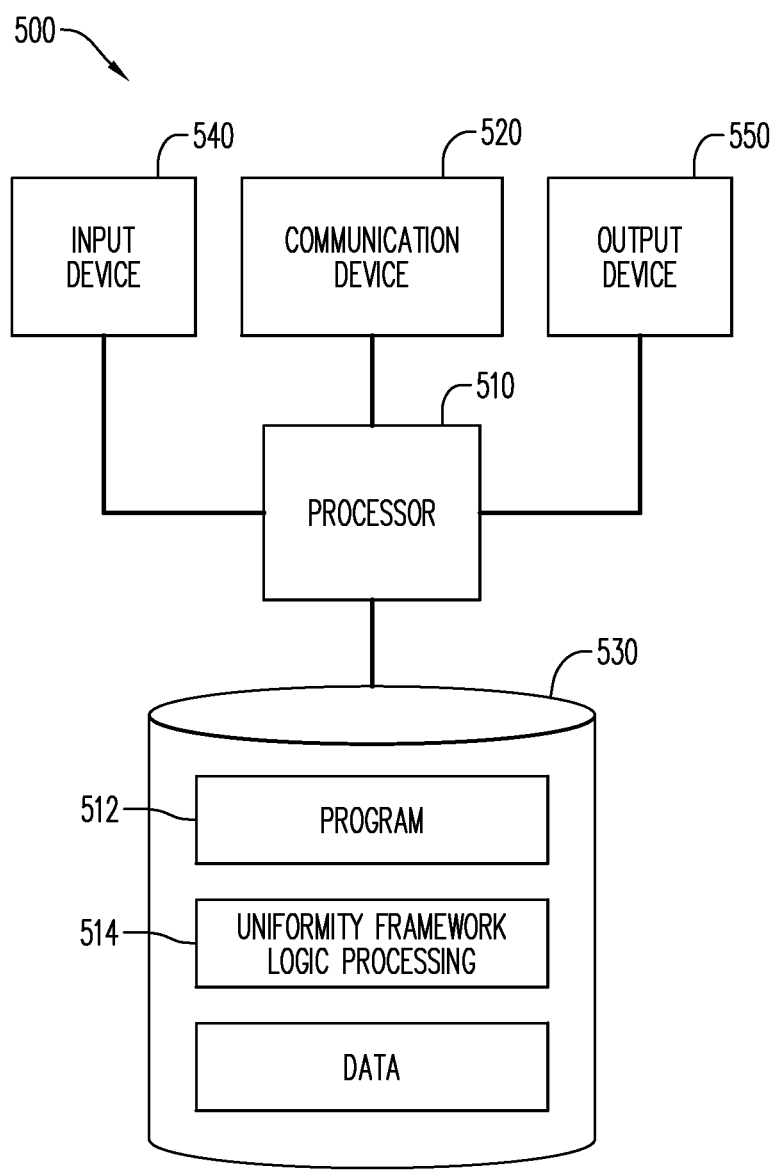
FIG. 5 is a block diagram of a system according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 400. Apparatus 500 may include other unshown elements according to some embodiments.

Apparatus 500 includes a data uniformity framework processor 510 operatively coupled to communication device 520, application server/data storage device/memory 530, one or more input devices 540, and one or more output devices 550. Communication device 520 may facilitate communication with external devices, such as application server/data storage device/memory 530. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Application server/Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The application server/data storage device/memory 530 stores a program 512 and/or data uniformity framework platform logic 514 for controlling the processor 510. The processor 510 performs instructions of the programs 512, 514, and thereby operates in accordance with any of the embodiments described herein, including but not limited to process 300.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a data uniformity framework module;
a data uniformity framework processor in communication with the data uniformity framework module and operative to execute processor-executable process steps to cause the system to:
receive an indication that an action event was executed at a primary application;
extract one or one or more key data elements affected by the execution of the action event, wherein each key data element comprises a combination of a table name and a field name mapping that uniquely identifies the key data element;
log the extracted one or more key data elements in a notification log;
receive a request from a secondary application for the logged data;
transmit the logged data to the secondary application; and
manipulate secondary application data that corresponds to the logged data to replace the secondary application data with the logged data enabling data uniformity between the primary application and the secondary application.

2. The system of claim 1, wherein the notification log is stored in a persistent layer.

3. The system of claim 1, wherein the action event is one of an archiving write action, an archiving delete action, and destruction run using archiving write program action, an archived data destruction action, a destruction with data destruction objection (DOBJ), a block action and an unblock action.

4. The system of claim 1, wherein the key data elements are tagged by an owner of the primary application as key data elements prior to receipt of the action event.

5. The system of claim 1, wherein the extracted one or more key data elements have a time stamp of when the action event was executed.

6. The system of claim 1, wherein the request from the secondary application is an extraction application programming interface (API).

7. The system of claim 1, wherein the one or more key data elements include at least one of base data and enhanced data.

8. The system of claim 7, wherein base data is data that defined by a primary application owner, and enhanced data is base data that has been manipulated.

9. The system of claim 1, wherein the logging and extraction of one or more key data elements is controlled via an authorization object.

10. The system of claim 1, wherein the secondary application is connected to the primary application in a system landscape via a communication channel.

11. The system of claim 1, further comprising processor-executable process steps to cause the system to:
log the indication of the action event, wherein the secondary application periodically checks the notification log for the logged indication of the action event and pulls the information when the action event is indicated.

12. A method comprising:
receiving an indication that an action event was executed at a primary application;
extracting one or one or more key data elements affected by the execution of the action event, wherein each key data element comprises a combination of a table name and a field name mapping that uniquely identifies the key data element;
logging the extracted one or more key data elements in a notification log stored in a persistent layer;
receiving a request from a secondary application for the logged data;
transmitting the logged data to the secondary application; and
manipulating secondary application data that corresponds to the logged data to replace the secondary application data with the logged data enabling data uniformity between the primary application and the secondary application.

13. The method of claim 12, wherein the action event is one of an archiving write action, an archiving delete action, and destruction run using archiving write program action, an archived data destruction action, a destruction with a destruction objection (DOBJ) a block action and an unblock action.

14. The method of claim 12, wherein the key data elements are tagged by an owner of the primary application as key data elements prior to receipt of the action event.

15. The method of claim 12, further comprising:
logging the indication of the action event, wherein the secondary application periodically checks the notification log for the logged indication of the action event and pulls the information when the action event is indicated.

16. The method of claim 12, wherein the extracted one or more key data elements have a time stamp of when the action event was executed.

17. The method of claim 12, wherein the request from the secondary application is an extraction application programming interface (API).

18. A non-transitory computer-readable medium storing program code, the program code executable by a computer system to cause the computer system to:
receive an indication that an action event was executed at a primary application;
extract one or one or more key data elements affected by the execution of the action event, wherein the key data element comprises a combination of a table name and a field name mapping that uniquely identifies the key data element;
log the extracted one or more key data elements in a notification log stored in a persistent layer;
receive a request from a secondary application for the logged data;
transmit the logged data to the secondary application; and
manipulate secondary application data that corresponds to the logged data to replace the secondary application data with the logged data enabling data uniformity between the primary application and the secondary application.

19. The medium of claim 18, wherein the action event is one of an archiving write action, an archiving delete action, and destruction run using archiving write program action, an archived data destruction action, a destruction with (DOBJ) a block action and an unblock action.

20. The medium of claim 18, wherein the key data elements are tagged by an owner of the primary application as key data elements prior to receipt of the action event.

* * * * *